No. 734,915. PATENTED JULY 28, 1903.
A. H. MARKS.
PNEUMATIC TIRE.
APPLICATION FILED APR. 2, 1902.
NO MODEL.
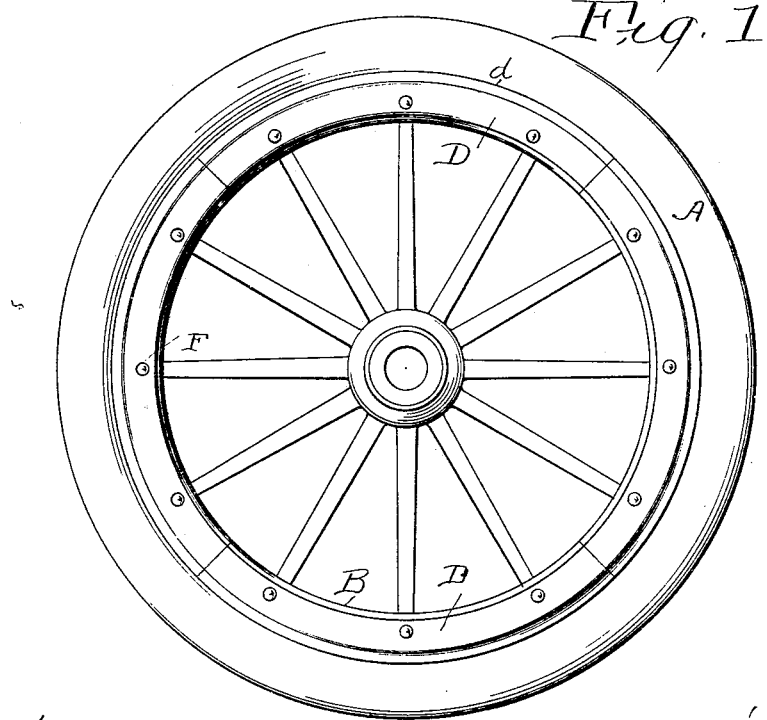
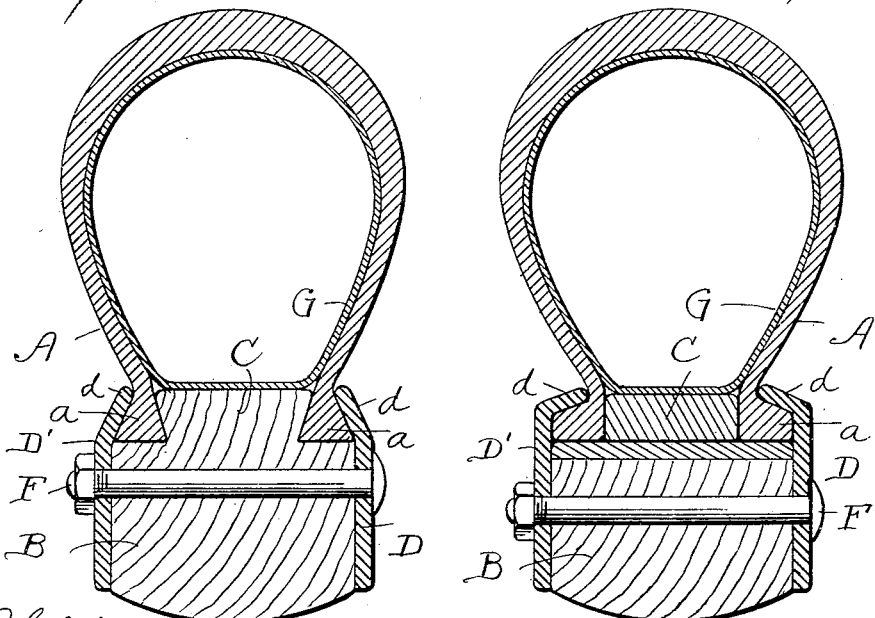
Witnesses: E. B. Gilchrist, H. W. Wise
Inventor: Arthur H. Marks
By Thurston & Bates, Attorneys No. 734,915.

Patented July 28, 1903.

UNITED STATES PATENT OFFICE.

ARTHUR H. MARKS, OF AKRON, OHIO, ASSIGNOR TO THE DIAMOND RUBBER COMPANY, OF AKRON, OHIO, A CORPORATION OF WEST VIRGINIA.

PNEUMATIC TIRE.

SPECIFICATION forming part of Letters Patent No. 734,915, dated July 28, 1903.

Application filed April 2, 1902. Serial No. 101,100. (No model.)

*To all whom it may concern:*

Be it known that I, ARTHUR H. MARKS, a citizen of the United States, residing at Akron, in the county of Summit and State of Ohio, have invented a certain new and useful Improvement in Pneumatic Tires, of which the following is a full, clear, and exact description, reference being had to the accompanying drawings.

Not a few very serious accidents to automobilists have occurred from using the form of clencher-tires in which the tire-sheath is held in engagement with the flanges of the rim by the pressure of the inflated inner tube. When an automobile equipped with such tires is in rapid motion and one of the tires is punctured, the tires not infrequently are drawn or pushed loose from the rim, because there is nothing to hold it on, and it is in this manner that the accidents referred to have taken place.

The object of this invention is to provide novel means wholly independent of the inflatable inner tube for detachably holding a double-tube tire on the wheel; and the invention consists in the construction and combination of parts hereinafter described, and pointed out definitely in the claims.

In the drawings, Figure 1 is a side view of a wheel-rim and tire constructed in accordance with my invention. Fig. 2 is a transverse sectional view of the preferred form of such invention, and Fig. 3 is a transverse sectional view of a modified construction.

Referring to the parts by letters, A represents the outer sheath of the tire, having, as is customary, external ribs $a$ at its edges.

B represents the wheel-rim.

C represents what may be termed a "flange," which circles the wheel-rim externally and occupies a position midway between its edges. This flange may be a part of the wheel-rim, as shown in Fig. 3; but preferably it is an independent piece encircling but not fastened to the rim, as shown in Fig. 2, in which latter case it may be made of any suitable material.

D D' represent annular plates which are secured to the sides of the rim, and they may each be made of one piece or a plurality of sections. Their edges $d$, which extend beyond the rim, are bent so as to overhang the same, as shown, and thereby form recesses, to which the ribs $a$ on the tire-sheath are fitted.

It will be observed that the peripheries of the flanges $d$ of the plates D D' are in substantially the same plane as the outer surface of the flange C. By this construction the cutting of the tire by the flanges $d$ in case the tire should become deflated, as by reason of a puncture, is prevented, since the thickest portion of the outer sheath of the tire will bear against the flange C, thereby preventing the thin portions of the tire adjacent to the flanges $d$ from bearing against the peripheries of said flanges and being cut by the same.

The flange C is of such width and thickness that it substantially fills the space between so much of the proximate edges of the sheath as lies within said flanges $d$.

To connect the tire onto the rim in the construction shown in Fig. 2, one of the plates D D' is removed, and one ribbed edge of the sheath is placed in the recess between the rim and the flange $d$ of the other plate. The flange C is then slipped onto the rim to the position shown, the inner tube G is inserted, the other edge of the sheath is then moved in against the rim and the flange, and finally the other side plate D' is placed in the position shown in engagement with the rib $a$ upon the sheath, and both plates may be fastened to the rim by bolts F. Of course if the flange C is part of the wheel-rim both plates D D' must be removed in order to attach the sheath to the rim.

It will be seen that the tire-sheath is locked upon the rim by means which are wholly independent of the inflatable tube G. The sheath cannot be disconnected from the rim even when the tube G is wholly inflated, and therefore it is not possible for the tire to fly from the rim of the wheel in rapid motion if the tire is punctured. To detach the tire from the rim for any reason, one or both of the plates D D' must be removed.

Having described my invention, I claim—

1. In a detachable double-tube pneumatic tire, the combination of a wheel-rim provided with a centrally-arranged peripheral flange, plates removably secured to said rim extending along the sides of the same and bent inwardly to form flanges, the peripheries of the flanged portions of said plates being in substantially the plane of the outer surface of the peripheral rim-flange, a tire-sheath having ribs or beads adapted to fit within the recesses formed between said peripheral rim-flange and the flanges of the plates, and an inflatable tube within said sheath, substantially as described.

2. In a detachable double-tube pneumatic tire, the combination of a rim provided with a centrally-arranged removable peripheral flange, flat plates extending along the opposite sides of said rim and removably secured thereto and bent inwardly to form flanges, the peripheries of the flanged portions of said plates being in substantially the same plane as the outer surface of the peripheral rim-flange, a tire-sheath having ribs or beads adapted to fit within the recesses formed between the flanges of said plates and the rim-flange, and an inflatable inner tube for said sheath, substantially as described.

In testimony whereof I hereunto affix my signature in the presence of two witnesses.

ARTHUR H. MARKS.

Witnesses:
P. B. JOHNSTON,
J. L. MARSHALL.